No. 659,963. Patented Oct. 16, 1900.
A. O. GRAF.
ROLL HOLDING CAMERA.
(Application filed Mar. 20, 1900.)
(No Model.) 3 Sheets—Sheet 1.

WITNESSES:
M. H. Wurtzel
Geo. L. Wheelock

INVENTOR
Adolf Otto Graf
BY
ATTORNEYS

THE NORRIS PETERS CO., PHOTO-LITHO., WASHINGTON, D. C.

No. 659,963. Patented Oct. 16, 1900.
A. O. GRAF.
ROLL HOLDING CAMERA.
(Application filed Mar. 20, 1900.)
(No Model.) 3 Sheets—Sheet 2.
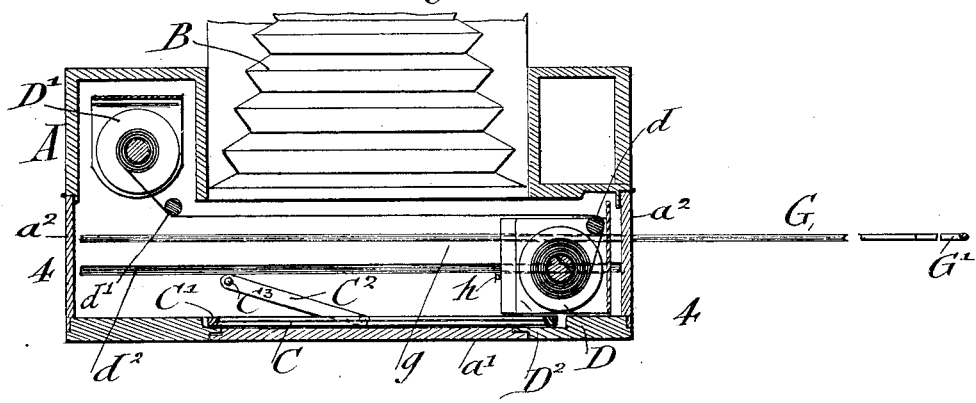
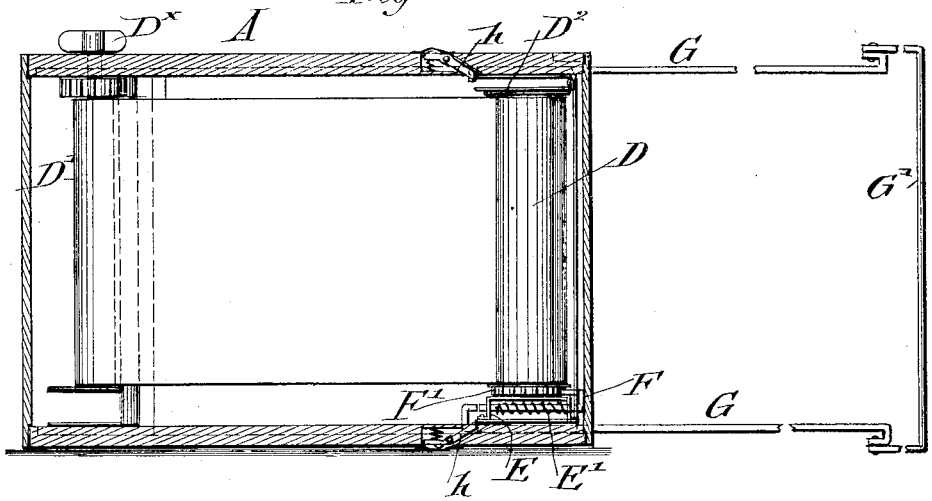
WITNESSES:
W. H. Wurtzel
Geo. L. Wheelock
INVENTOR
Adolf Otto Graf
BY
ATTORNEYS No. 659,963. Patented Oct. 16, 1900.
A. O. GRAF.
ROLL HOLDING CAMERA.
(Application filed Mar. 20, 1900.)

(No Model.) 3 Sheets—Sheet 3.

WITNESSES:

INVENTOR
Adolf Otto Graf
BY
ATTORNEYS

UNITED STATES PATENT OFFICE.

ADOLF OTTO GRAF, OF DEMAREST, NEW JERSEY.

ROLL-HOLDING CAMERA.

SPECIFICATION forming part of Letters Patent No. 659,963, dated October 16, 1900.

Application filed March 20, 1900. Serial No. 9,371. (No model.)

*To all whom it may concern:*

Be it known that I, ADOLF OTTO GRAF, a citizen of the United States, residing at Demarest, in the county of Bergen and State of New Jersey, have invented certain new and useful Improvements in Photographic Cameras, of which the following is a specification.

This invention has reference to certain improvements in photographic cameras, and more especially to a camera which can be used in the ordinary manner with a ground glass and plate-holder and also as a camera in which a film-carrying roll-holder is arranged in such a manner that different sections of the film can be readily focused on the ground glass before exposure and moved entirely out of the way when the camera is to be used as an ordinary plate-camera.

The invention consists of a photographic camera provided with a space for the plate-holder, a shiftable ground glass, a roll-holder, means for guiding said roll-holder in the said space for the plate-holder, means for releasing the roll-holder, so as to unwind the required length of film, mechanism for locking the roll-holder when moved across the camera for exposing the film portion, and a winding-up roll adjacent to the normal position of the roll-holder for the successive winding up of the exposed films; and the invention consists, further, of certain details of construction and combinations of parts, which will be fully described hereinafter and finally pointed out in the claims.

Figure 1:
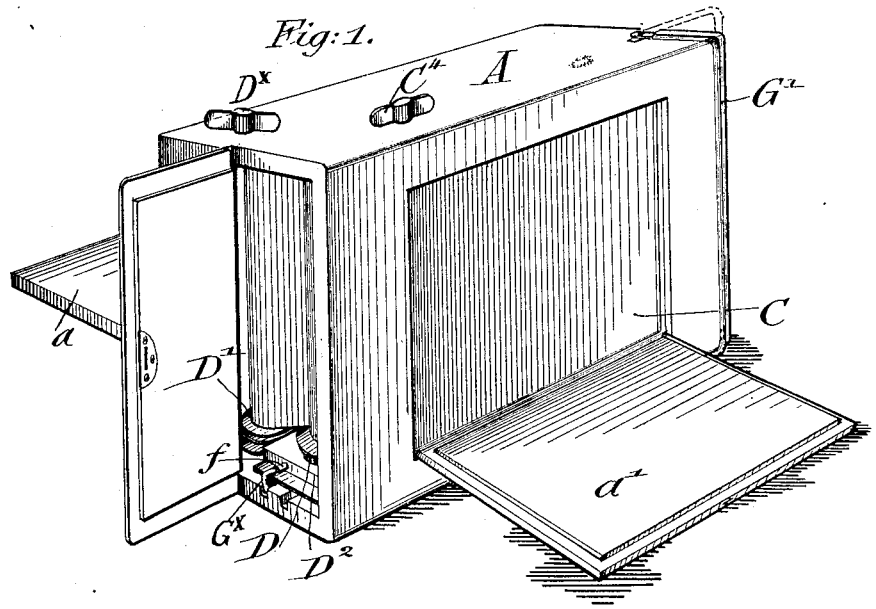
Figure 2:
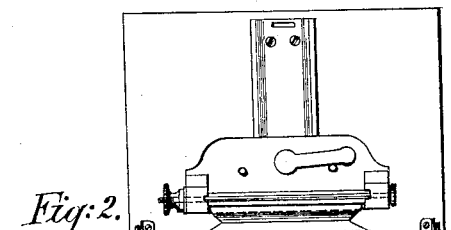
Figure 5:
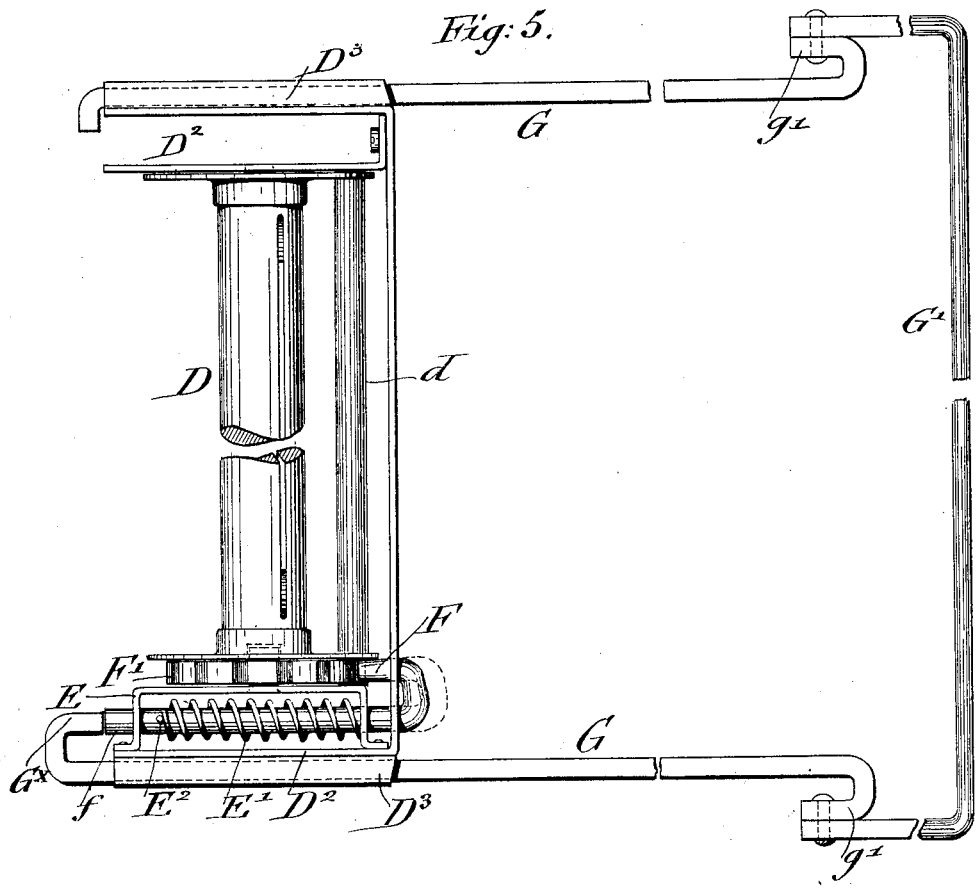
Figure 6:
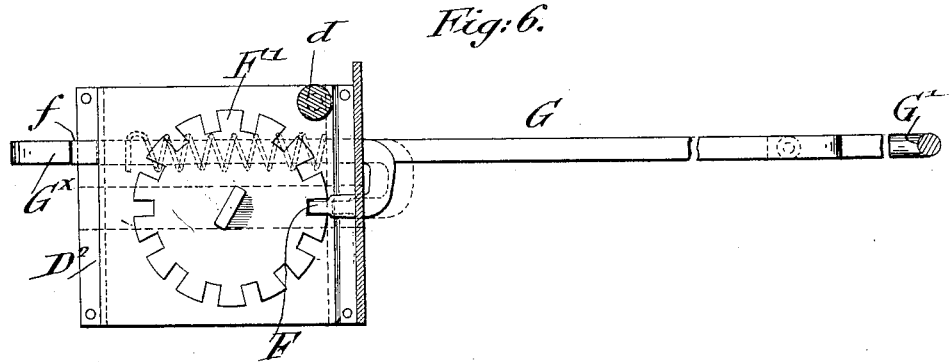

In the accompanying drawings, Figure 1 represents a perspective view of my improved photographic camera. Fig. 2 is a horizontal section, parts in elevation, showing the roll-holder in its normal position, so that the camera can be used in the ordinary manner with the ground glass and plate-holder. Fig. 3 is also a horizontal section showing the roll-holder moved across the camera, so as to expose a portion of the film. Fig. 4 is a vertical transverse section of the camera on line 4 4, Fig. 3. Fig. 5 is a detail plan view, parts broken out, of the roll-holder with its locking and releasing mechanism; and Fig. 6 is a longitudinal section of Fig. 5.

Similar letters of reference indicate corresponding parts.

Referring to the drawings, A represents the exterior box or casing of my improved photographic camera. The casing A is provided with a hinged front lid $a$, a hinged rear lid $a'$, and hinged side lids $a^2$. The hinged front lid $a$ serves for guiding the lens-carrying frame of the bellows-shaped portion B of the camera, so that the same can be extended forwardly and locked in proper position in the well-known way. The ground glass C is arranged at the rear portion of the casing A and inclosed by a suitable frame C', to which is pivoted the crank $C^2$ of a center pivot $C^3$, the upper end of which extends through the casing and is provided with a suitable handle $C^4$, by which the ground glass can be moved and swung into forward position at the rear end of the bellows portion, so as to produce the focusing of the picture to be taken when an ordinary plate-holder is to be used. The forward position of the ground glass is shown in dotted lines in Fig. 2. The ground glass after focusing is moved in backward direction by its crank-handle $C^4$ and the plate-holder inserted through the right-hand opening and the exposure made in the usual way. Sufficient space is arranged for the plate-holder at the rear end of the bellows-shaped portion B.

At the left-hand rear corner of the casing A is arranged a roll-holder D, while at the left-hand front corner is placed a winding-up roller D', the shaft of the latter being extended through the top of the casing and provided with a handle $D^\times$, so as to permit the turning of the winding-up roller when desired. The film is wound up on the roll-holder in the usual manner and secured in a slit in the winding-up roller, the film being suitably guided from the roll-holder D to the winding-up roller D', as shown clearly in Fig. 2.

The roll-holder D is provided at its lower end with a pawl-and-ratchet device F F', the pawl F being preferably made in the form of a U-shaped wire, the longer leg of which is extended through the keeper E below the roll-holder, a helical spring E' being interposed between a pin $E^2$ on the longer leg of the pawl and the opposite end of the keeper, as shown clearly in Fig. 5. The projecting end $f$ of the pawl F is engaged by the bent-up inner end or abutment $G^\times$ of a slide-frame G, which is guided in suitable top and bottom grooves $g$ of the casing A, the upper portion of the frame engaging the upper end of the roll-holder. The opposite end of the slide-frame G is extended beyond the casing and provided with bent ends $g'$, which extend over the top and bottom of the casing, said outwardly-bent ends $g'$ being pivotally connected with a bail or handle $G'$, as shown clearly in Figs. 1, 4, and 5. On the supporting-frame $D^2$ of the roll-holder D is supported a guide-roller $d$, while a second guide-roller $d'$ is supported in the casing between the roll-holder D and the winding-up roller $D'$. The supporting-frame $D^2$ of the roll-holder D is further provided at both ends with suitable flanges $D^3$, that are guided in longitudinal grooves $d^2$ in the top and bottom of the casing, so as to permit the roll-holder to move from its normal position at the left-hand corner of the casing toward the second position at the right-hand corner of the casing whenever the camera is to be used for making film exposures, in which case the handle $G'$ of the slide-frame G is taken hold of and pulled. The outward motion of the slide-frame G causes it to act on the projection $f$ of the longer leg of the spring-pawl F and to release the pawl from the ratchet-wheel $F'$ of the roll-holder D, so that during the continuance of this pressure the roll-holder will be turned on its axis and cause the unwinding of the film, assisted by the guide-roller $d'$ and the winding-up roller $D'$. When the roll-holder D arrives in its position at the right-hand corner of the casing, as shown in Figs. 3 and 4, the supporting-frame $D^2$ of the roll-holder is engaged at the upper and lower ends by suitable spring-actuated catches $h$, which engage the ends of said supporting-frame, so as to retain the frame firmly in position and hold the unrolled film in tightly-stretched position at the inner end of the bellows-shaped portion B at the point where the ground glass was placed when the picture was focused. If the film is not sufficiently stretched, a slight turn is imparted to the roller $D'$ by turning the handle $D^\times$. After the film-picture is taken the roll-holder is released from its retaining-catches $h\ h$ by pressing with the thumb on the upper catch, this pressure, which is imparted through the camera, being sufficient to release the lower catch, after which the winding-up roller is turned by the handle $D^\times$ at the upper end of its shaft, so that the film exposed is wound up, while simultaneously the roll-holder is moved backward across the camera to its normal position at the left-hand corner of the same, the slide-frame being also moved simultaneously until it arrives at the right-hand end of the casing, whereupon its handle is folded over alongside of the same in the position shown in Fig. 1. The same operation is repeated when the next exposure is to be made, the ground glass being used for focusing the film in the same manner as before for the focusing of the sensitized plate. The film exposures may be continued until the film of the roll-holder is entirely transferred to the winding-up roller, which can be readily ascertained by opening the lid at the left-hand side of the casing or in any other suitable manner, as by a counter, as well known, for indicating the number of films exposed, said counter being operated by the reciprocating motion of the roll-holder.

My improved photographic camera is used as follows: When it is to be used as an ordinary camera, the ground glass C is moved forward by its crank-pin $C^3$ until the proper focus is obtained. The ground glass is then moved backward again, the plate-holder inserted, and the picture taken by exposure in the usual manner. When film-pictures are to be taken, the focusing is done on the ground glass C in the same manner, the ground glass returned into its normal position at the rear part of the camera, and the roll-holder D moved transversely across the casing by the slide-frame G, so as to stretch the required length of film across the rear end of the bellows-shaped portion of the camera, after which the film is exposed in the usual manner. The roll-holder is then returned to its normal position by winding the exposed film on the winding-up roller $D'$, all parts being then returned to their normal position. The locking of the roll-holder by its pawl-and-ratchet mechanism prevents the unwinding of the film during the return motion of the roll-holder. The camera can thus be used for ordinary pictures on sensitized glass plates in connection with the plate-holder or for making film-pictures, both being possible in one structure, by which the value of the camera is considerably increased.

Having thus described my invention, what I claim as new, and desire to secure by Letters Patent, is—

1. In a photographic camera, the combination, with the casing provided with a ground glass, of means for shifting the ground glass forward and backward in the camera, a roll-holder arranged at one side of the camera, a winding-up roller adjacent to the roll-holder at the same side of the camera, and means for moving the roll-holder across the camera to the opposite side of the same so as to unwind the required length of film, and hold it in position for exposure, substantially as set forth.

2. In a photographic camera, the combination, with the casing provided with a ground glass, of means for moving the ground glass into forward or backward position, a film-carrying roll-holder located at one side of the camera, a winding-up roller adjacent the roll-holder, a guide-roller between said roll-holder and winding-up roller, means for moving the roll-holder across the casing to the opposite side thereof, and means for locking the roll-holder in the second position so as to permit exposure of the film stretched across the casing, substantially as set forth.

3. In a photographic camera, the combination, with the casing, provided with a ground glass, of means for shifting the ground glass forwardly or backwardly, a roll-holder at one side of the casing, means for locking the roll-holder in its position, a slide-frame adapted to release the roll-holder and move it transversely across the casing, a winding-up roller adjacent to the normal position of the roll-holder, and a guide-roller between the roll-holder and winding-up roller, so that by the transverse motion of the roll-holder a film is stretched across the casing, substantially as set forth.

4. In a photographic camera, the combination, with the casing, of a film-carrying roll-holder supported at one side of the same, a pawl-and-ratchet mechanism for locking the roll-holder, a guide-roller on the supporting-frame of the roll-holder, a guide-roller in the casing, a winding-up roller adjacent to the roll-holder and guide-roller, and means for moving the roll-holder across the casing, substantially as set forth.

5. In a photographic camera, the combination, with a casing provided with guideways, of a roll-holder supported at one corner of said casing, means for guiding said roll-holder in the guideways of the casing, a pawl-and-ratchet mechanism for locking the roll-holder, a guide-roller adjacent to the roll-holder, a second guide-roller in the casing, a winding-up roller adjacent to the normal position of the roll-holder, and a slide-frame guided in grooves of the casing and adapted to release the pawl from the ratchet mechanism so as to unlock the roll-holder, said slide-frame being provided with a handle at the outside of the casing, substantially as set forth.

6. In a photographic camera, the combination of the casing, a roll-holder carrying one end of a sensitized film, means for moving the said roll-holder transversely of the camera, and a ground-glass plate movable across the path of movement of the roll-holder, substantially as set forth.

In testimony that I claim the foregoing as my invention I have signed my name in presence of two subscribing witnesses.

ADOLF OTTO GRAF.

Witnesses:
PAUL GOEPEL,
M. H. WURTZEL.